United States Patent [19]

Manis et al.

[11] Patent Number: 4,588,771
[45] Date of Patent: May 13, 1986

[54] STABILIZED THIOFUNCTIONAL POLYSILOXANE FLUIDS AND A PROCESS FOR STABILIZING THE SAME

[75] Inventors: Paul A. Manis, Allentown, Pa.; Eugene R. Martin, Onsted; Ronald L. Muntz, Adrian, both of Mich.

[73] Assignee: SWS Silicones Corporation, Adrian, Mich.

[21] Appl. No.: 721,822

[22] Filed: Apr. 10, 1985

[51] Int. Cl.⁴ ............................................. C08K 5/24
[52] U.S. Cl. .................................... 524/731; 556/401; 524/262; 524/265; 524/267; 524/247; 524/249; 524/236; 524/722; 524/714; 524/730

[58] Field of Search ................ 556/401; 524/262, 265, 524/267, 247, 249, 236, 722, 714, 730, 731

[56] References Cited

U.S. PATENT DOCUMENTS 4,203,913  5/1980  Burkhardt et al. ................. 556/401

Primary Examiner—Melvyn I. Marquis

[57] ABSTRACT

Thiofunctional polysiloxane fluids are stabilized against degradation in the presence of kaolin clay by adding an amine containing compound to the thiofunctional polysiloxane fluids.

26 Claims, No Drawings

STABILIZED THIOFUNCTIONAL POLYSILOXANE FLUIDS AND A PROCESS FOR STABILIZING THE SAME

The present invention relates to thiofunctional polysiloxane fluids which are resistant to clay induced degradation and more particularly to a process for stabilizing thiofunctional polysiloxane fluids against degradation in the presence of kaolin clays at elevated temperatures.

BACKGROUND OF THE INVENTION

Thiofunctional polysiloxane fluids may be prepared by reacting a thiofunctional silane or siloxane with an organopolysiloxane in the presence of acidic clays to form thiofunctional polysiloxane polymers. These thiofunctional polymers degrade in the presence of acidic clays, especially at elevated temperatures, to form volatile, lower molecular weight siloxanes and odor forming products, often resulting in the loss of desirable functional groups and producing lower molecular weight siloxanes.

When these thiofunctional polysiloxane fluids are used in an electrostatic copying apparatus as a release agent to effect release between the toner treated paper which is impregnated with kaolin clays and a heated fuser roll the thiofunctional fluids have a tendency to degrade and form low molecular weight siloxanes and odor producing products. It is believed that this is caused by the kaolin clay which is present in the paper residue that collects in the sump along with the excess release agent and when the sump contents are reused the combination of acidic kaolin clay and the high temperature of the fuser roll causes the thiofunctional polysiloxane fluids to degrade to form volatile, low molecular weight siloxanes having reduced functional groups. Condensation of the low molecular weight volatile siloxanes on electrical switches can inhibit the switches function due to the good dielectric properties of the siloxanes.

Therefore, it is an object of this invention to provide a process for stabilizing thiofunctional polysiloxanes. Another object of this invention is to provide a process for stabilizing thiofunctional polysiloxanes against degradation in the presence of kaolin clays. A further object of this invention is to provide a process where thiofunctional polysiloxane fluids are rendered resistant to degradation in the presence of heat and kaolin clay without significantly affecting the properties of the thiofunctional polysiloxane fluids.

SUMMARY OF THE INVENTION

The foregoing objects and others which will become apparent from the following description are accomplished in accordance with this invention, generally speaking, by providing a process for stabilizing thiofunctional polysiloxane fluids in the presence of kaolin clays which comprises adding an amine containing compound to a thiofunctional polysiloxane fluid in an amount of from 0.001 to 5 percent based on the weight of the amine compound and the thiofunctional polysiloxane fluid at a temperature of from about 20° C. to 200° C.

DETAILED DESCRIPTION OF THE INVENTION

Thiofunctional polysiloxane fluids which are stabilized in accordance with this invention are represented by the formula $$(R'SR'')_b\overset{R_a}{\underset{|}{Si}}O_{\frac{3-(a+b)}{2}}Z_c$$

where R is a monovalent hydrocarbon radical or a halogenated hydrocarbon radical having from 1 to 18 carbon atoms, R' is hydrogen or a monovalent hydrocarbon radical having from 1 to 18 carbon atoms, R" is a divalent hydrocarbon radical free of aliphatic unsaturation having from 2 to 18 carbon atoms, hydrocarbonoxy radicals or hydrocarbon thioether radicals, in which R" is bonded to the silicon atom via a silicon-carbon bond, Z is a radical selected from an R'O$_{0.5}$ or R$_3$SiO$_{0.5}$ radical, a is a number of from 0 to 2, b is a number of from 1 to 3 and the sum of a+b is equal to at least 2, and c is a number of from 0 to 3.

Thiofunctional polysiloxanes which may be employed in the process of this invention are siloxane copolymers containing from 1 to 99 mole percent of siloxane units of the formula $$R_eSiO_{\frac{4-e}{2}}$$

and from 99 to 1 mole percent of siloxane units having at least one thiol unit of the formula $$(R'SR''-)_b\overset{R_a}{\underset{|}{Si}}O_{\frac{4-(a+b)}{2}}$$

in which R, R', R", a and b are the same as above and e is a number of from 0 to 2. These copolymers may also contain R'O and R$_3$SiO units in which R and R' are the same as above.

Suitable examples of monovalent hydrocarbon radicals represented by R are alkyl radicals, such as methyl, ethyl, propyl, butyl, octyl, dodecyl, and octadecyl radicals; aryl radicals, such as the phenyl and naphthyl radicals; alkenyl radicals, such as the vinyl and allyl radicals; cycloalkyl radicals, such as cyclobutyl, cyclopentyl and cyclohexyl radicals; alkaryl radicals, such as the tolyl, xylyl, ethylphenyl radicals; aralkyl radicals, such as the benzyl,α-phenyl-ethyl, B-phenyl-ethyl and α-phenylbutyl radicals.

Examples of halogenated monovalent hydrocarbon radicals represented by R are the haloalkyl radicals such as the 3,3,3-trifluoropropyl radical and halaryl radicals such as the o-, m-, and p- chlorophenyl radicals.

Examples of monovalent hydrocarbon radicals represented by R' are alkyl radicals, such as methyl, ethyl, propyl, butyl, octyl, dodecyl and octadecyl radicals; aryl radicals, such as the phenyl and naphthyl radicals; alkenyl radicals such as the vinyl and allyl radicals; cycloalkyl radicals, such as cyclobutyl, cyclopentyl and cyclohexyl radicals; alkaryl radicals, such as the tolyl, xylyl, ethyl phenyl radicals and aralkyl radicals, such as the benzyl, α-phenylethyl, B-phenylethyl and α-phenylbutyl radicals.

Examples of suitable divalent hydrocarbon radicals represented by R" are ethylene, trimethylene, tetramethylene, hexamethylene, octamethylene and the like.

Examples of divalent hydrocarbonoxy radicals represented by R" are those having the formulas R'''$+$OC$_2$H$_4$—)$_r$, R'''$+$OC$_2$H$_4$OCH$_2$)$_r$, R'''$+$OC$_3$H$_6$—)$_r$ and R'''$+$OC$_4$H$_8$—)$_r$, where R''' is a divalent hydrocarbon radical having from 1 to 4 carbon atoms and r is a number of from 1 to 20. Specific examples of radicals represented by R''' are methylene, ethylene, propylene and butylene radicals. Specific examples of divalent hydrocarbonoxy radicals are ethylene oxide, trimethylene oxide, tetramethylene oxide and polymers thereof as well as corresponding thioether radicals where sulfur is substituted for the oxygen in the hydrocarbonoxy radicals.

The thiofunctional polysiloxane fluids may be prepared in accordance with U.S. Pat. No. 4,046,795 to Martin, in which a disiloxane and/or a hydroxy or hydrocarbonoxy containing silane or siloxane is equilibrated with a cyclic trisiloxane in the presence of an acid catalyst and at least one of the above organosilicon compounds contain a thiol group.

Catalysts which may be employed in effecting the reaction between a disiloxane and/or a hydroxy and/or hydrocarbonoxy containing silane or siloxane and a cyclic trisiloxane in which at least one of the reactants contains a thiol group are acid clays and organic and inorganic acids having a pK value less than 1.0 and more preferably 0.7 in an aqueous solution. Suitable acid catalysts which may be employed are benzenesulfonic acid, para-toluene-sulfonic acid, sulfuric acid, sulfurous acid, nitric acid, perchloric acid, hydrochloric acid and acid clays such as Filtrol No. 13 and No. 24 (available from Filtrol Corporation).

The amount of catalyst is not critical, although it is preferred that from about 0.003 percent up to about 10 percent by weight of catalyst based on the total weight of the reactants, i.e., the silicon containing compounds used in the preparation of the thiofunctional polysiloxane fluids be employed. Greater amounts of catalyst may be used; however, the amount of catalyst should not be so great that it will alter the functionality of the resultant composition.

The catalyst may be removed or destroyed after the reaction is complete by washing with water or they may be destroyed by neutralizing with basic reagents. In addition, certain catalysts, such as acid clays, may be removed by filtration.

The reactions may be conducted at any temperature ranging from about 25° C. up to about 200° C. over a period of time ranging from 0.5 hours up to several days and, if desired, in the presence of a hydrocarbon solvent. Under certain conditions, for example, when an anhydrous acid catalyst is employed, a catalytic amount of a protic compound is required to effect the reaction. The term protic compound refers to compounds having a reactive hydrogen such as alcohols, e.g., methanol, ethanol, propanol, butanol and water. The amount of protic compound is not critical and may range from about 0.0001 to about 10 percent based on the total weight of the silicon containing reactants.

The reaction may be conducted at atmospheric, subatmospheric or superatmospheric pressure in the presence or absence of a solvent. When a solvent is employed, it may be employed in an amount of from about 1 to 50 percent by weight based on the weight of silicon containing reactants. Examples of suitable hydrocarbon solvents are heptane, benzene, toluene, xylene and the like. It is, however, preferred that the reaction be conducted in an inert atmosphere.

Hydroxy and hydrocarbonoxy containing silanes which may be employed are silanes such as 3-mercaptopropyltrimethoxysilane, 2-mercaptoethyltriethoxysilane, w-mercaptodecyltriethoxysilane, 2-mercaptohexyltripropoxysilane, w-mercaptoamyltriethoxysilane, 2-(triethoxysilyl)ethyl butyl thioether, 3-(triethoxysilyl)propyl butyl thioether, 4-(triethoxysilyl)butyl methyl thioether, 2-(methyldiethoxysilyl)ethyl methyl thioether, 2-(methyldiethoxysilyl)ethyl phenyl thioether, 2-(methyldiethoxysilyl)ethyl dodecyl thioether, 6-(trimethoxysilyl)hexyl ethyl thioether, methyltriethoxysilane, dimethyldiethoxysilane, trimethylethoxysilane, dimethylsilane diol, diphenylsilane diol and the like.

The corresponding siloxanes or copolymers thereof which contain at least one or more alkoxy or hydroxy groups may also be employed. Suitable examples of these polysiloxanes are monoethoxy endblocked beta-mercaptoethyl propylpolysiloxane, methyldiethoxysilyl endblocked beta-mercaptobutyl methylpolysiloxane, monohydroxy endblocked beta-mercaptoethyl methylpolysiloxane, dihydroxy endblocked dimethylpolysiloxane, diethoxy endblocked dimethylpolysiloxane and the like.

Examples of suitable disiloxanes are hexamethyldisiloxane, hexaethyldisiloxane, hexapropyldisiloxane, hexoctyldisiloxane, di(3-mercaptopropyl)tetramethyldisiloxane and the like.

Examples of suitable cyclic siloxanes are hexamethylcyclotrisiloxane, hexaethylcyclotrisiloxane, hexaphenylcyclotrisiloxane, hexabutylcyclotrisilxoane, hexaoctylcyclotrisiloxane, 1,2,3-trimethyl-1,2,3-triphenylcyclotrisiloxane and the like.

The thiofunctional polysiloxane fluids employed in the process of this invention may, for example, be prepared in accordance with the process described in U.S. Pat. No. 4,046,795 to Martin, which is incorporated herein by reference.

Thiofunctional polysiloxane fluids may also be prepared by reacting hydroxyl containing polysiloxanes with silanes containing thiol groups or by the cohydrolysis of chloroalkylchlorosilanes, dialkyldichlorosilanes and trimethylchlorosilanes and thereafter reacting the chloroalkyl groups with sulfur containing compounds such as sodium sulfohydride in the presence of dimethylformamide. These thiofunctional polysiloxane fluids and their methods of preparation are described in U.S. Pat. Nos. 3,346,405 to Viventi; 2,960,492 to Morton and 3,388,144 to Musolf et al.

Amine containing compounds which may be employed as stabilizing agents are organic amines having the general formula

aminofunctional silanes of the formula

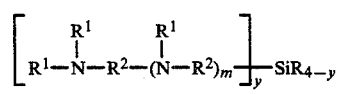

and aminofunctional siloxanes of the formula

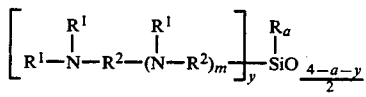

where R is the same as above, $R^1$ which may be the same or different represents hydrogen or monovalent hydrocarbon radicals having from 1 to 30 carbon atoms which may be substituted with hydroxyl groups, $R^2$, which is the same or different, is a divalent hydrocarbon radical having from 1 to 20 carbon atoms, a is a number of from 0 to 2, m is an integer of from 0 to 20 and y is a number of from 1 to 4.

Examples of monovalent hydrocarbon radicals represented by $R^1$ are alkyl radicals such as the methyl, ethyl, propyl, butyl, hexyl, octyl, decyl, dodecyl, hexadecyl, octadecyl, eicosyl, docosyl, hexacosyl, octacosyl and triacontyl radicals; alkenyl radicals such as ethenyl, 1-propenyl, 1-isobutenyl, 1-isomers of heptenyl, octenyl, nonenyl, dodecenyl, heptadecenyl, nonadecenyl and eicosenyl; aryl radicals such as phenyl, α-naphthyl, B-naphthyl and α-anthryl radicals; alkaryl radicals such as the o-tolyl, m-tolyl, 2,3-xylyl, 2,4-xylyl, o-cumenyl, m-cumenyl, o-ethyphenyl, m-ethylphenyl, p-ethylphenyl, 2-methyl-α-naphthyl, 1-ethyl-B-naphthyl, 2,3-dipropyl-60-naphthyl radicals and aralkyl radicals such as benzyl, α-phenylethyl, B-phenyl ethyl, 2-phenylbutyl, α'-naphthylmethyl, α-(α'-naphthyl) ethyl and the corresponding α' and B' naphthyl derivatives of n-amyl up to and including the octadecyl radical.

Examples of divalent hydrocarbon radicals represented by $R^2$ are alkylene radicals such as ethylene, trimethylene, tetramethylene, hexamethylene, octamethylene, tetradecamethylene, octadecamethylene and arylene radicals such as phenylene diphenylene and naphthylene radicals.

Examples of suitable organic amines which may be employed are aliphatic and aromatic, primary, secondary and tertiary amines such as isopropylamine, n-propylamine, n-butyl-amine, sec-butylamine, tert-butylamine, N-methyl-N-ethylamine, N-methyl-N-ethyl-isopropylamine, 2-amino-3-methylbutane, N,N-dimethylethylamine, allylamine, n-amylamine, isoamylamine, n-hexylamine, n-octylamine, n-decylamine, N,N-diethylpropylamine, ethanolamine; diethanolamine, triethanolamine, ethylenediamine, diethylenetriamine; triethylenetetramine, aniline, methylaniline, dimethylaniline, ethylaniline, o, m, or p- toluidine, 2,3-dimethylaniline, 3,5-dimethylaniline, 2,4-dimethylaniline, diphenylamine, and triphenylamine, p-phenylenediamine, 4,4'diaminodiphenylmethane.

Other amines which may be employed are those having the formulas

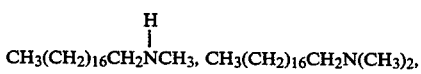

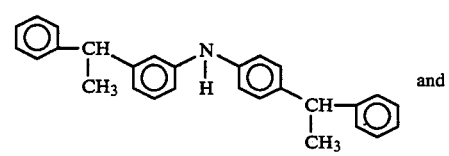

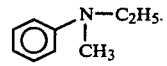

Amine containing silicon compounds which may be used in the process of this invention are amino-functional silanes and siloxanes. Examples of aminofunctional silanes which may be employed are beta-aminopropyltriethoxysilane, gamma-aminopropyltrimethoxysilane, methyl-beta-(aminoethyl)-gamma-aminopropyldimethoxysilane, omega-aminohexyltributoxysilane, beta-(aminoethyl)propyltrimethoxysilane, beta-(aminoethyl)hexyltriethoxysilane, beta-(aminopropyl)-butyltributoxysilane, (trimethylsilylpropyl)ethylenediamine and (trimethylsilylisobutyl)-ethylenediamine.

The aminofunctional siloxanes employed in the process of this invention are well known in the art. They may be prepared in accordance with the process described in U.S. Pat. No. 2,947,771 to Bailey, in which an aminofunctional silane is equilibrated with a siloxane in the presence of an alkali-metal hydroxide. Also, they may be prepared in accordance with the process described in U.s. Pat. No. 3,598,853 to Friedman et al, in which an aminofunctional silane is condensed with a silanol terminated polydiorganosiloxane. Other methods for preparing aminofunctional siloxane fluids are described in U.S. Pat. Nos. 3,890,269 to Martin; 2,930,809 to Jex et al and 3,045,036 to Jex et al. The aminofunctional siloxanes described in these references and their methods of preparation are incorporated herein by reference.

Representative examples of aminofunctional siloxanes are

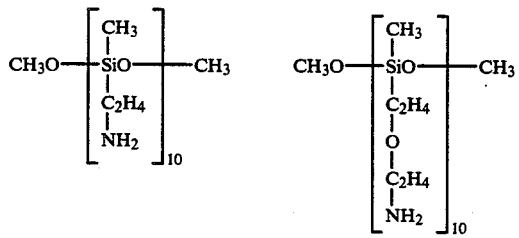

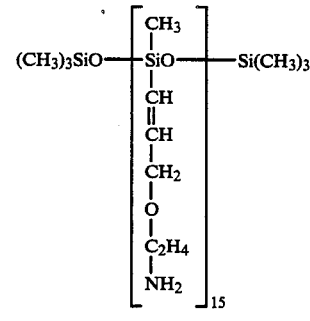

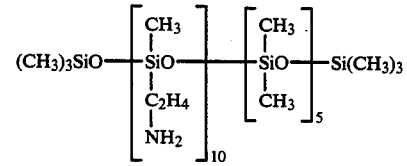

-continued

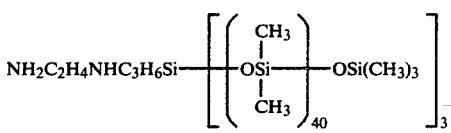

and the like.

Aminofunctional organopolysiloxane copolymers may be prepared in accordance with the procedure described in U.S. Pat. No. 3,544,498 to Holdstock et al, in which a mixture containing the silanol chain-terminated polyorganosiloxane and an aminoalkoxyalkylsilane or aminoalkoxyalkenylsilane and if desired, an aminoalkylsilane are partially hydrolyzed and condensed by adding the necessary amount of water to provide the degree of hydrolysis and condensation desired. Generally, the amount of hydrolysis and condensation desired is that amount which will result in a copolymer having the desired viscosity and the desired alkoxy content. After the partial hydrolysis and condensation the reaction mixture consists of the organopolysiloxane copolymer, free alcohol corresponding to the alkoxy group which is hydrolyzed from the silane by the water addition and water resulting from the condensation of the silanol groups. The water and alcohol are stripped from the reaction mixture at reduced pressures and at temperatures ranging from room temperature up to 60° C. and more preferably at temperatures up to 40° C.

The amount of amine containing compounds which may be added to the thiofunctional polysiloxane fluids to prevent degradation in the presence of kaolin clays may range from about 0.001 up to about 5 percent by weight, preferably from about 0.005 to 2 percent by weight and more preferably from about 0.1 to about 1 percent based on the weight of the thiofunctional polysiloxane fluid and amine compound.

It is preferred that the amine containing compounds be added to the thiofunctional polysiloxane fluids at a temperature of from about 20° C. to 40° C. and then heated up to a temperature of about 80° C. and more preferably from about 60° to 80° C. However, it has been found that the thiofunctional polysiloxane fluids may be stabilized in the absence of heat by merely mixing the amine with the thiofunctional polysiloxane fluids at temperatures as low as 20° C.

The thiofunctional polysiloxane fluids obtained from the process of this invention are stable at elevated temperatures in the presence of kaolin clays. These thiofunctional polysiloxane fluids may be used as fuser agents in an electrostatic copying apparatus where they contact clay impregnated paper without gelling even at elevated temperatures.

Specific embodiments of this invention are further illustrated in the following examples in which all parts are by weight unless otherwise specified.

PREPARATION OF THIOFUNCTIONAL POLYSILOXANE FLUIDS

The thiofunctional polysiloxane fluids used in the following examples are prepared in the following manner:

(A) A thiofunctional polysiloxane fluid is prepared by adding 167 parts of 3-mercaptopropyltrimethoxysilane, 140 parts of water, 250 parts of toluene, 100 parts of hexamethyldisiloxane and 60 parts of Filtrol No. 13 acid clay (available from Filtrol Corporation) to a reaction vessel containing 2770 parts of hexamethylcyclotrisiloxane heated to 70° C. The vessel is then heated to 100° C. and maintained at this temperature for three hours. The contents of the vessel are then cooled to 60° C. and filtered. The volatiles are stripped off for about 3 hours at 190° C. at less than 1 torr. A clear, transparent liquid is obtained having a viscosity of about 115 mPa·s at 25° C. Nuclear Magnetic Resonance (NMR) analysis shows that the product has a mol ratio of $HSC_3H_6:Si(CH_3)_2$ of 1:42. The SH content of the product is about 0.72 percent.

(B) A thiofunctional polysiloxane fluid is prepared by adding 80 parts of 3-mercaptopropyltrimethoxysilane to a reaction vessel containing 1184 parts of a hydroxyl terminated dimethylpolysiloxane having a viscosity of about 350 mPa·s at 25° C. and containing 2.43 percent by weight of hydroxyl groups. The reactants are heated to 200° C. for one hour and then vacuum stripped for two hours at 200° C. at less than 1 torr. A clear product having a viscosity of about 72.1 mPa·s at 25° C. is obtained which by Nuclear Magnetic Resonance has a ratio of $CH_3O:HSC_3H_6:Si(CH_3)_2$ of 1.58:1.0:32.4. The percent of SH is about 0.79 percent.

EXAMPLE 1

A thiofunctional polysiloxane fluid prepared in accordance with (A) above and having a viscosity of about 100 mPa·s at 25° C. are mixed with varying amounts of 4,4'-bis-(alpha-methyl-benzyl)diphenylamine of the formula

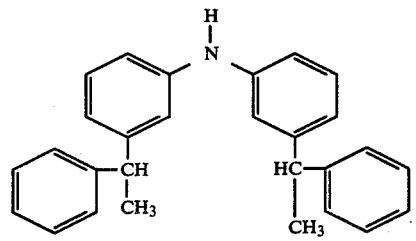

at a temperature of from 20° to 30° C. About five parts of each mixture are placed in two aluminum evaporating dishes. To one dish is added 0.1 part of kaolin clay (available from R. T. Vanderbilt Co.), and then both dishes are placed in a 200° C. forced air oven for 24 hours. The percent of weight loss due to degradation and the formation of volatile siloxanes is determined. The results are illustrated in the Table.

TABLE

| | Thiofunctional | | Percent Weight Loss | |
|---|---|---|---|---|
| Example No. | Polysiloxane Fluid (Parts) | Amine (Parts) | Without Kaolin Clay | With Kaolin Clay |
| (a) | 99.99 | .01 | 0.89 | 5.53 |
| (b) | 99.975 | .025 | 1.19 | 4.04 |
| (c) | 98.00 | 2.0 | 7.59 | 7.51 |
| (d) | 100.0 | — | 1.17 | 8.64 |

EXAMPLE 2

The procedure of Example 1 is repeated, except that the thiofunctional polysiloxane fluid prepared in accordance with (B) above is substituted for the thiofunctional polysiloxane prepared in (A) above. The percent of volatiles obtained in the presence of kaolin clay is substantially reduced.

EXAMPLE 3

The procedure of Example 1 is repeated, except that 0.1 part of the following amines are substituted for 4,4'-bis-(alpha-methylbenzyl)diphenylamine. These amines include diphenylamine, dimethyloctadecylamine, N-methyloctadecylamine and octadecylamine.

EXAMPLE 4

The procedure of Example 1 is repeated except that 0.15 parts of 2-aminoethyl-3-propyltrimethoxysilane and 3-aminopropylethoxysilane are substituted for 4,4'-bis-(alpha-methylbenzyl)diphenylamine.

EXAMPLE 5

The procedure of Example 1 is repeated, except that 0.5 parts of an aminofunctional polysiloxane fluid prepared in (c) above are substituted for 4,4'-bis-(alpha-methylbenzyl)-diphenylamine. The volatiles developed as the result of heating the thiofunctional polysiloxane fluid in the presence of kaolin clay are substantially reduced.

The aminofunctional polysiloxane fluid used in this example is prepared by heating a mixture containing about 26 parts of beta-(aminoethyl)-gamma-aminopropyltrimethoxysilane and 0.03 parts of potassium hydroxide to a temperature of 145° C. for three hours. After cooling the liquid product to room temperature, 0.03 parts of acetic acid are added to neutralize the catalyst. The product is filtered and a liquid product having a viscosity of about 40 mPa·s at 25° C. is recovered. Nuclear Magnetic Resonance (NMR) analysis indicates that the ratio of beta-(aminoethyl)-gamma-aminopropyl to OCH$_3$ to (CH$_3$)$_2$SiO groups is about 1:3:36.

What is claimed is:

1. A stable thiofunctional polysiloxane fluid comprising a thiofunctional polysiloxane fluid having units of the formula

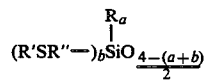

where R is selected from the group consisting of a monovalent hydrocarbon radical having from 1 to 18 carbon atoms and a halogenated monovalent hydrocarbon radical having from 1 to 18 carbon atoms, R' is selected from the group consisting of hydrogen and a monovalent hydrocarbon radical having from 1 to 18 carbon atoms, R" is selected from the group consisting of a divalent hydrocarbon radical free of aliphatic unsaturation having from 2 to 18 carbon atoms, a hydrocarbonoxy radical and a hydrocarbon thioether radical in which R" is bonded to the silicon atom via a silicon-carbon bond, a is a number of from 0 to 2, b is a number of from 1 to 3 and the sum of a+b is equal to at least 2 and from 0.001 to 5 percent by weight of an amine containing compound based on the weight of the thiofunctional polysiloxane fluid and the amine containing compound, in which the amine containing compound is selected from the group consisting of an organic amine, an aminofunctional silane and an aminofunctional siloxane.

2. The stable thiofunctional polysiloxane fluid of claim 1, wherein the organic amine has the formula

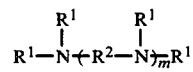

where R$^1$ is selected from the group consisting of hydrogen, monovalent hydrocarbon radicals having from 1 to 30 carbon atoms and monovalent hydrocarbon radicals substituted with hydroxyl groups, R$^2$ is a divalent hydrocarbon radical having from 1 to 20 carbon atoms and m is an integer of from 0 to 20.

3. The stable thiofunctional polysiloxane fluid of claim 2, wherein at least one R$^1$ is a monovalent hydrocarbon radical substituted with a hydroxyl group.

4. The stable thiofunctional fluid of claim 1, wherein the thiofunctional polysiloxane fluid is a copolymer containing from 1 to 99 mole percent of siloxane units of the formula

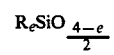

where R is selected from the group consisting of a monovalent hydrocarbon radical having from 1 to 18 carbon atoms and a halogenated monovalent hydrocarbon radical having from 1 to 18 carbon atoms and e is a number of from 0 to 2.

5. The stable thiofunctional polysiloxane fluid of claim 1, wherein the amine containing compound is an aminofunctional silane.

6. The stable thiofunctional polysiloxane fluid of claim 5, wherein the aminofunctional silane is 2-aminoethyl-3-aminopropyltrimethoxysilane.

7. The stable thiofunctional polysiloxane fluid of claim 1, wherein the amine containing compound is present in an amount of from 0.005 to 2 percent by weight based on the weight of the thiofunctional polysiloxane fluid and the amine containing compound.

8. The stable thiofunctional polysiloxane fluid of claim 1, wherein the amine containing compound is present in an amount of from 0.1 to 1 percent by weight based on the weight of the thiofunctional polysiloxane fluid and the amine containing compound.

9. A process for preparing a stable thiofunctional polysiloxane fluid which comprises adding an amine containing compound selected from the group consisting of an organic amine, an aminofunctional silane and an aminofunctional siloxane to a thiofunctional polysiloxane fluid having units of the formula

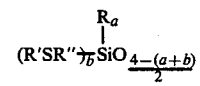

where R is selected from the group consisting of a monovalent hydrocarbon radical having from 1 to 18 carbon atoms and a halogenated monovalent hydrocarbon radical having from 1 to 18 carbon atoms, R' is selected from the group consisting of hydrogen and a monovalent hydrocarbon radical having from 1 to 18 carbon atoms, R" is selected from the group consisting of a divalent hydrocarbon radical free of aliphatic unsaturation having from 2 to 18 carbon atoms, a hydrocarbonoxy radical and a hydrocarbon thioether radical in which R" is bonded to the silicon atom via a silicon-carbon bond, a is a number of from 0 to 2, b is a number of from 1 to 3 and the sum of a +b is equal to at least 2 in an amount of from 0.001 to 5 percent by weight based on the weight of the amine containing compound and the thiofunctional polysiloxane fluid.

10. The process of claim 9, wherein the amine containing compound has the formula

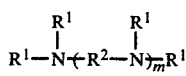

where $R^1$ is selected from the group consisting of hydrogen, monovalent hydrocarbon radicals having from 1 to 30 carbon atoms and monovalent hydrocarbon radicals substituted with hydroxyl groups, $R^2$ is a divalent hydrocarbon radical having from 1 to 20 carbon atoms and m is an integer of from 0 to 20.

11. The process of claim 9, wherein the mixture containing the thiofunctional polysiloxane fluid and amine containing compound is heated to a temperature up to 200° C.

12. The process of claim 9, wherein the thiofunctional polysiloxane fluid is a copolymer containing from 1 to 99 mole percent of siloxane units of the formula $$R_e SiO_{\frac{4-e}{2}}$$

where R is selected from the group consisting of a monovalent hydrocarbon radical having from 1 to 18 carbon atoms and a halogenated monovalent hydrocarbon radical having from 1 to 18 carbon atoms and e is a number of from 0 to 2.

13. The process of claim 9, wherein the amine containing compound is present in an amount of from 0.005 to 2 percent by weight based on the weight of the thiofunctional polysiloxane fluid and the amine containing compound.

14. The process of claim 9, wherein the amine containing compound is present in an amount of from 0.1 to 1 percent by weight based on the weight of the thiofunctional polysiloxane fluid and the amine containing compound.

15. The stable thiofunctional polysiloxane fluid of claim 1, wherein the thiofunctional polysiloxane fluid contains kaolin clay.

16. The process of claim 9, wherein the thiofunctional polysiloxane fluid contains kaolin clay.

17. The stable thiofunctional polysiloxane fluid of claim 5, wherein the aminofunctional silane is represented by the formula

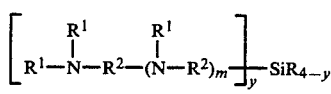

where R is selected from the group consisting of a monovalent hydrocarbon radical having from 1 to 18 carbon atoms and a halogenated monovalent hydrocarbon radical having from 1 to 18 carbon atoms, $R^1$ is selected from the group consisting of hydrogen, monovalent hydrocarbon radicals having from 1 to 30 carbon atoms and monovalent hydrocarbon radicals substituted with hydroxyl groups, $R^2$ is a divalent hydrocarbon radical having from 1 to 20 carbon atoms, m is an integer of from 0 to 20 and y is a number of from 1 to 4.

18. The stable thiofunctional polysiloxane fluid of claim 1, wherein the amine containing compound is an aminofunctional siloxane.

19. The stable thiofunctional polysiloxane fluid of claim 5, werein the aminofunctional silane is 3-aminopropyltriethoxysilane.

20. The stable thiofunctional polysiloxane fluid of claim 18, wherein the aminofunctional siloxane is represented by the formula

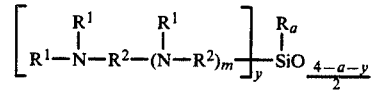

where R is selected from the group consisting of a monovalent hydrocarbon radical having from 1 to 18 carbon atoms and a halogenated monovalent hydrocarbon radical having from 1 to 18 carbon atoms, $R^1$ is selected from the group consisting of hydrogen, monovalent hydrocarbon radicals having from 1 to 30 carbon atoms and monovalent hydrocarbon radicals substituted with hydroxyl groups, $R^2$ is a divalent hydrocarbon radical having from 1 to 20 carbon atoms, a is a number of from 0 to 2, m is an integer of from 0 to 20 and y is a number of from 1 to 4.

21. The process of claim 9, wherein the amine containing compound is an aminofunctional silane.

22. The process of claim 21, wherein the aminofunctional silane is 3-aminopropyltriethoxysilane.

23. The process of claim 21, wherein the aminofunctional silane is 2-aminoethyl-3-aminopropyltrimethoxysilane.

24. The process of claim 21, wherein the aminofunctional silane is represented by the formula

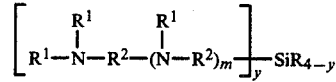

where R is selected from the group consisting of a monovalent hydrocarbon radical having from 1 to 18 carbon atoms and a halogenated monovalent hydrocarbon radical having from 1 to 18 carbon atoms, $R^1$ is selected from the group consisting of hydrogen, monovalent hydrocarbon radicals having from 1 to 30 carbon atoms and monovalent hydrocarbon radicals substituted with hydroxyl groups, $R^2$ is a divalent hydrocarbon radical having from 1 to 20 carbon atoms, m is an integer of from 0 to 20 and y is a number of from 1 to 4.

25. The process of claim 9, wherein the amine containing compound is an aminofunctional siloxane.

26. The process of claim 25, wherein the aminofunctional siloxane is represented by the formula

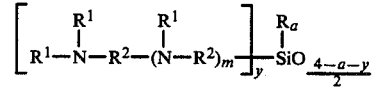

where R is selected from the group consisting of a monovalent hydrocarbon radical having from 1 to 18 carbon atoms and a halogenated monovalent hydrocarbon radical having from 1 to 18 carbon atoms, $R^1$ is selected from the group consisting of hydrogen, monovalent hydrocarbon radicals having from 1 to 30 carbon atoms and monovalent hydrocarbon radicals substituted with hydroxyl groups, $R^2$ is a divalent hydrocarbon radical having from 1 to 20 carbon atoms, a is a number of from 0 to 2, m is an integer of from 0 to 20 and y is a number of from 1 to 4.

* * * * *